(12) United States Patent
Wagman et al.

(10) Patent No.: US 7,289,704 B1
(45) Date of Patent: Oct. 30, 2007

(54) FIBER OPTIC CABLES THAT KINK WITH SMALL BEND RADII

(75) Inventors: Richard S. Wagman, Hickory, NC (US); William S. Jackman, Hickory, NC (US); Warren W. McAlpine, Hickory, NC (US); David A. Seddon, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/590,504

(22) Filed: Oct. 31, 2006

(51) Int. Cl.
*G02B 6/44* (2006.01)
(52) U.S. Cl. .................... 385/100; 385/113
(58) Field of Classification Search ......... 385/100–114
See application file for complete search history.

(56) References Cited

U.S. PATENT DOCUMENTS 4,331,378 A * 5/1982 Hartig ........................ 385/108
4,723,831 A * 2/1988 Johnson et al. ............. 385/111

OTHER PUBLICATIONS

Draka Product Sheet, BendBright[XS] Single Mode Optical Fibre, 2 sheets, Aug. 2006.

* cited by examiner

*Primary Examiner*—Sarah Song
(74) *Attorney, Agent, or Firm*—Michael E. Carroll Jr.

(57) ABSTRACT

Fiber optic cables are disclosed that allow a relatively small bend radius and/or may kink while still preserving optical performance. In one embodiment, the fiber optic cable includes at least one optical fiber, a first strength member, a second strength member, a core material, and a cable jacket. The core material generally surrounds the optical fiber, the first strength member, and the second strength member and the core material is deformable for cushioning the optical fiber. The cable jacket generally surrounds the core material and allows a bending radius of about 10 millimeters or less while maintaining a suitable level of optical performance.

24 Claims, 4 Drawing Sheets

FIBER OPTIC CABLES THAT KINK WITH SMALL BEND RADII

FIELD OF THE INVENTION

The present invention relates generally to fiber optic cables used for indoor, outdoor, and/or indoor/outdoor use. More specifically, the present invention relates to fiber optic cables that kink with relatively small bend radii while preserving optical performance.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical fiber cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from fully utilizing the relatively high-bandwidth capacity of the optical fiber long-hauls links.

As optical fibers are deployed deeper into communication networks, subscribers will have access to increased bandwidth. But certain obstacles exist that make it challenging to route optical fibers/optical cables toward the subscriber. For instance, the connection of subscribers to the communication network requires a low-cost solution that is user-friendly for installation, connectorization, and versatility. Moreover, the reliability and robustness of the distribution fiber optic cable may have to withstand the rigors of an outdoor environment. For instance, outdoor fiber optic cables can have rigid strength members such as glass-reinforced plastic strength members that stiffen the cable and inhibit the bending of the cable beyond a minimum bend radius, thereby preserving optical performance. For instance, a typical bend radius for this type of stiff cable is about 15 centimeters for protecting the optical fiber and preserving optical performance. On the other hand, indoor fiber optic cables may use less rigid strength members such as aramid yarns that allow bending of the fiber optic cable into a much smaller radius. But no matter the structure, the craft understands that conventional fiber optic cable designs typically have a minimum bend radius that should not be exceeded. Further, the craft avoids kinking the fiber optic cable because they understand that kinking the fiber optic cable may result in damage or highly degraded optical performance.

Simply stated, the craft understands that bending fiber optic cables beyond their minimum bend radius can cause significant increases in optical attenuation. Thus, the craft avoids bending fiber optic structures cable beyond their minimum bend radius. As fiber optic cables push toward the subscriber the end user or installer may not be a highly trained craftsman that understands that bending the fiber optic cable into a relatively small radius can cause significant optical attenuation. Consequently, there is a need for fiber optic cable designs that are robust and allow for aggressive bending of the same without causing undue optical attenuation.

SUMMARY OF THE INVENTION

Fiber optic cables are disclosed that allow a relatively small bend radius and/or may kink while still preserving optical performance. One aspect of the present invention is directed to a fiber optic cable having at least one optical fiber, a first strength member, a second strength member, a core material, and a cable jacket. The core material generally surrounds the at least one optical fiber, the first strength member, and the second strength member, wherein the core material is deformable for cushioning the at least one optical fiber. The cable jacket generally surrounds the core material. The fiber optic cable allows a bending radius of about 10 millimeters or less while maintaining a suitable level of optical performance.

Another aspect of the present invention is directed to a fiber optic cable having at least one optical fiber, a first strength member, a core material, and a cable jacket. The core material generally surrounds the at least one optical fiber is deformable for cushioning the at least one optical fiber. The optical fiber is a bend resistant optical fiber, thereby allowing relatively small bend radii for the fiber optic cable while preserving optical performance. The first strength member has a tensile strength and a compressive strength where the tensile strength is greater than the compressive strength so that it may kink with a relatively small bend radius. The cable jacket generally surrounds the core material and allows kinking in a bend radius of about 30 millimeters or less while maintaining a suitable level of optical performance.

Still another aspect of the present invention is directed to a fiber optic cable having at least one optical fiber, a first strength member, a second strength member, a core material, and a cable jacket. The at least one optical fiber is a bend resistant optical fiber, thereby allowing relatively small bend radii for the fiber optic cable while preserving optical performance. The first strength member and the second strength member are generally disposed on opposite sides of the optical fiber and kink in a bend radius of about 30 millimeters or less. The core material generally surrounds the optical fiber, the first strength member, and the second strength member, wherein the core material is deformable for cushioning the at least one optical fiber. The cable jacket generally surrounds the core material and kinks in a bending radius of about 30 millimeters or less while maintaining a suitable level of optical performance.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Figure 1:
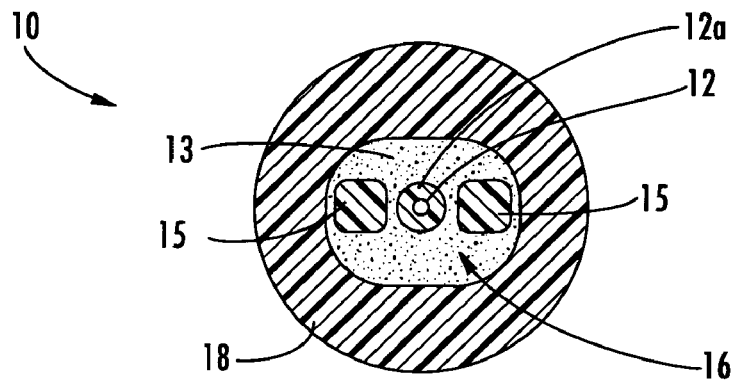
FIG. 1 depicts a cross-sectional view of a fiber optic cable according to the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 1 depicts a fiber optic cable 10 according to the present invention. Fiber optic cable 10 includes at least one optical fiber 12 disposed within a cable core 16 that is generally surrounded by a cable jacket 18. Cable core 16 includes a core material 13 and at least one strength member 15. As shown, cable core 16 includes two strength members 15 that are disposed on opposite sides of optical fiber 12. Generally speaking, cable core 16 has a generally oval shape to accommodate strength members 15 on opposite sides of optical fiber 12. Moreover, this arrangement of strength members 15 imparts a preferential bend characteristic to fiber optic cable 10. Fiber optic cables of the present invention are advantageous since they allow kinking when bent into a relatively small bend radius while still preserving optical performance. As used herein, kinking means a discontinuous bend radius where deformation of the cross-section of cable jacket 18 and/or one or more of strength members 15 occurs. Consequently, the fiber optic cables can withstand installations having aggressive bend radii and still provide suitable performance. In other words, if fiber optic cable 10 is bent into relatively small radii one or more strength members 15 and/or cable jacket 18 are intended to kink, while preserving the optical performance. For instance, with a 90 bend having about a 10 millimeter radius the delta attenuation for the optical fiber is about 0.1 dB or less.

As depicted, optical fiber 12 includes a buffer layer 12a for protecting optical fiber 12. Buffer layer 12a can be formed from any suitable material such as a polymer, radiation-curable material, or the like. For instance, one embodiment uses a suitable flame retardant material such as polyvinylchloride (PVC) for buffer layer 12a. Likewise, buffered optical fiber of the present invention can use any suitable optical fiber. For instance, the optical fiber may be a bend resistant optical fiber for allowing relatively small bend radii while maintaining optical performance as discussed herein. Of course, other types of optical fibers may be used.

Besides using different materials, buffer layer 12a may have any suitable size. By way of example, optical fiber 12 has a 250 micron outer diameter and buffer layer 12a upcoats optical fiber 12 to about 500 microns. Of course, buffer layer 12a may accommodate optical fibers having outer diameters other than 250 microns. Likewise, buffer layer 12a may have other outer diameters such as 700 or 900 microns.

Core material 13 contacts optical fiber 12 and strength members 15 as shown to form cable core 16. Cable core has a minor dimension of about 1.1 millimeters and a major dimension of about 1.5 millimeters. Generally speaking, core material 13 is a relatively compressible and/or flexible material, thereby reducing contact forces when the fiber optic cable is kinked. Moreover, since core material 13 fills the cable jacket cavity it also provides water-blocking protection. Suitable materials for core material are preferably dry and/or semi-solid. Examples of suitable materials include low-modulus elastomers such as Kraton® materials available from Kraton Polymers of Houston, Tex., polyurethanes (PU) such as ether-based PU or an ester-based PU. Additionally, core materials may be foamed for providing a compressible material with a lower modulus suitable materials for foaming include polyethylenes, fluoropolymers, or the like. Moreover, core material should be relatively easy to process and apply at high lines speeds. Preferably, core material 13 is also relatively easy to remove from the strength members and optical fiber. Likewise, core material 13 can have portions where it is thinly disposed on the strength members and/or optical fiber so it is easy to begin removing the same when necessary.

Strength members 15 are selected based on the desired tensile strength, geometry, and flexibility/kink transition (i.e., non-plastic to plastic deformation). Generally speaking, strength members 15 should have relatively high tensile strength, but low compression resistance (e.g., they kink when bent into a small bend radius). Illustratively, strength members 15 preferably have a compressive yield point that occurs at about 0.5% strain or less. Another measure of the flexibility/kink transition of strength members 15 is a ratio of tensile strength to compressive strength. In other words, the compresssive strength is the compressive force per area that the strength member can withstand and is less than the tensile strength of the strength member so it offers less resistance to bending. For instance, the ratio of tensile strength to compressive strength should generally be greater than 1, such as about 2 or more, and may approach values such as 4. Simply stated, the value of tensile strength should be larger than the compressive strength.

By way of example, each strength member 15 has an EA (tensile modulus times cross-sectional area) value of about 10,000 Newtons. Of course, strength members can have other EA values. Furthermore, strength member 15 has a shape that is generally rectangular with rounded corners with dimension of about 0.4 millimeters by 0.5 millimeters, but other shapes such as square, round, or oval are also possible along with other sizes are possible. Additionally, strength members have a flexibility/kink transition that is in the range of a bend radius of about 30 millimeters or less. In other words, at about 30 millimeters or less strength members 15 plastically deform and do not return to their original shape (i.e., they kink). Suitable materials for strength members include polyethylene naph-thalate (PEN), polyacetal (POM), highly orientated polyethylene, fiberglass impregnated with a latex material, or the like. Other suitable materials can include metal such as copper wires or the like that can bend and retain their bent shape.

Cable jacket 18 allows for relatively small bend radii since it may kink (i.e., plastically deform) when bent about a sharp radii such as about a 90 degree corner. Cable jacket 18 allows kinking by using a suitable relatively soft material that plastically deforms when subjected to sharp bending radii such as about 30 millimeters or less, more preferably, cable jacket kinks at about 25 millimeters or less. Cable jacket 18 preferably has a suitable modulus for allowing plastic deformation when bending into small radii. By way of example, cable jacket 18 is formed from a polymer such as soft PVC having a modulus of about 300 MPa or less such as in the range of about 100 MPa to about 300 MPa. Of course, using other types of polymers is possible. For instance, the cable jacket may be formed from an elastomeric material such as flame-retardant polyethylene (FRPE) or flame-retardant polyurethane (FRPU). Further, semi-crystalline materials such as polyethylenes and polyurethanes may be advantageous since they can indicate abusive use/installation since they will tend to stress-whiten with relatively high-levels of plastic deformation (e.g., 3-4% strain), thereby indicating abusive use to the craft. Additionally, fiber optic cable 10 may allow optical fiber 12 to have a strain that is greater than zero and less than about 1 percent at a tensile load of about fifty pounds or less, but other variations can have zero fiber strain at this load. In other words, the fiber optic cable design allows the optical fiber to experience some level of strain at the tensile load of about fifty pounds.

Figure 2:
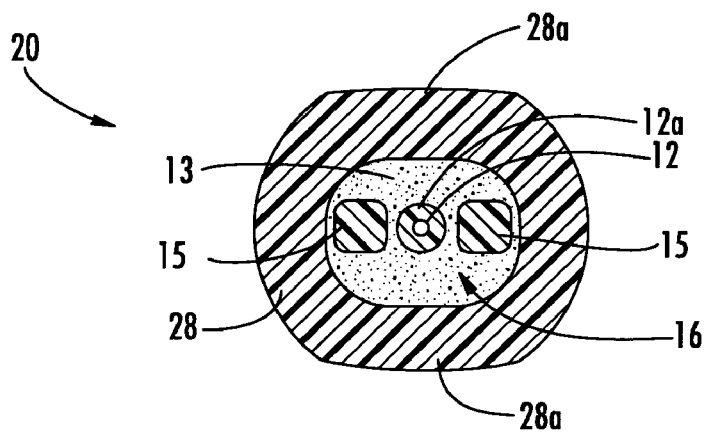
FIG. 2 depicts a cross-sectional view of a fiber optic cable similar to the fiber optic cable of FIG. 1 according to the present invention.

Additionally, the concepts of the present invention may be practiced with fiber optic cables having other cable jacket shapes. For instance, FIG. 2 depicts a fiber optic cable 20 that is similar to fiber optic cable 10, except that cable jacket 28 has two generally flat portions 28a disposed on opposite sides of the fiber optic cable. Since cable jacket 28 includes generally flat portions 28a it can be orientated against a flat surface such as a wall in the correct orientation. In other words, if a mechanical fastener such as a staple were used for securing the fiber optic cable it would be applied parallel with the strength members. Stated another way, the flat portions inhibit the fiber optic cable from being oriented so that a mechanical fastener would crush the optical fiber between the strength members. Likewise, the present invention can be practiced with fiber optic cables having other shapes.

Figure 3:
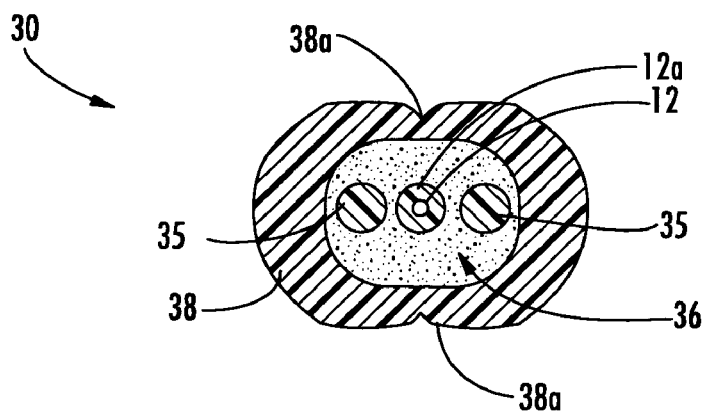
FIG. 3 depicts a cross-sectional view of another fiber optic cable according to the present invention.
Figure 4:
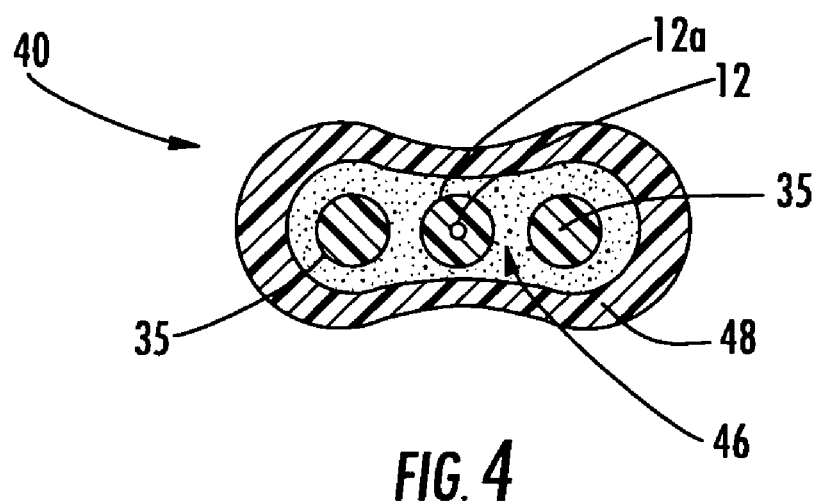
FIG. 4 depicts a cross-sectional view of a fiber optic cable according to the present invention.

Illustratively, FIG. 3 depicts a fiber optic cable 30 according to the present invention. Fiber optic cable 30 is similar to fiber optic cable 20, but it has a generally flat cross-sectional shape defined by a cable jacket 38. Fiber optic cable includes a cable core 36 having a pair of generally round strength members 35 disposed on each side of buffered optical fiber 12,12a. Cable jacket 38 of fiber optic cable 30 has two generally flat surfaces (not numbered) connected at the ends by arcuate surfaces (not numbered). Additionally, cable jacket 38 includes notches for initiating a tear in the same. FIG. 4 depicts a cross-sectional view of another fiber optic cable 40 according to the present invention. Fiber optic cable 40 is similar to fiber optic cable 30, but has a generally dogbone shape. Specifically, a cable core 46 of fiber optic cable 40 has a dogbone shape that generally conforms to an interior surface of a cable jacket 48. Additionally, fiber optic cables according to the present invention can have fewer components within the cable core.

Figure 5:
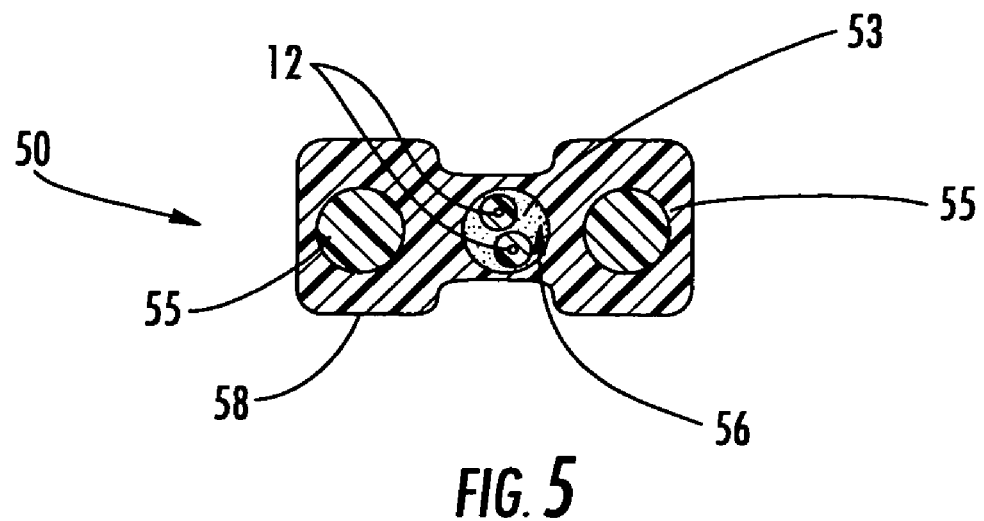
FIG. 5 depicts a cross-sectional view of a fiber optic cable according to the present invention.

By way of example, FIG. 5 depicts a cross-sectional view of a fiber optic cable 50 according to the present invention where a cable core 56 includes two optical fibers and a core material 53 within a cavity (not numbered) of a cable jacket 58. In this fiber optic cable, strength members 55 are disposed within cable jacket 58, which has a generally "H" cross-sectional shape. Fiber optic cables according to the present invention can have other variations such including other cable components and/or other configurations. For instance, if the fiber optic cable is intended for outdoor use in may further include other components for water-blocking such as one or more water-swellable tapes, yarns, or the like. Likewise, fiber optic cables can include other components such as ripcords, armor, or the like.

The cables of the present invention may also advantageously use optical fibers that are relatively bend resistant for preserving optical performance when subjected to relatively small bend radii. For instance, fiber optic cable 10 has a relatively small delta attenuation when bent into a relatively small bend radius. By way of example, when bent into a radius of about 10 millimeters for about 90 degrees the optical fiber 12 of fiber optic cable preferably has a delta optical attenuation of about 0.1 dB or less, thereby preserving suitable levels of optical performance for the fiber optic cable. For instance, four 90 degree bends during the installation of the fiber optic cable would result in the delta optical attenuation of about 0.4 dB or less.

By way of example, bend resistant optical fibers may have microstructures and/or other configurations that allow reduced bend radii while preserving optical performance. Microstructured optical fibers disclosed herein comprise a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. In preferred embodiments, optical fiber disclosed herein is thus single-mode transmission optical fiber.

In some embodiments, the microstructured optical fiber disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm.

By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than 95% of and preferably all of the holes exhibit a mean hole size in the cladding for the optical fiber which is less than 1550 nm, more preferably less than 775 nm, most preferably less than about 390 nm.

Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

Figure 6:
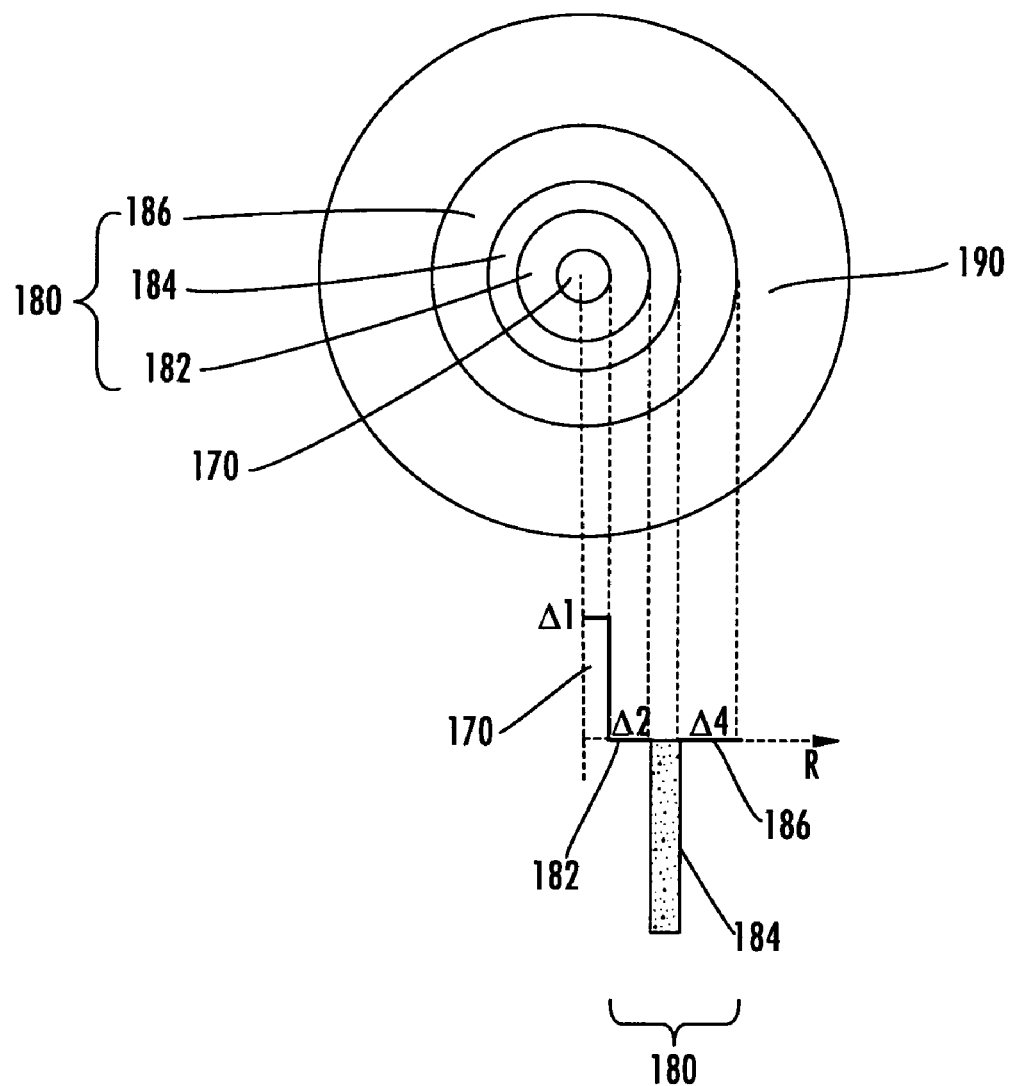
FIG. 6 is a cross-sectional representation of a bend resistant optical fiber useful for buffered optical fibers of the present invention.

In one set of embodiments, the core region includes doped silica to provide a positive refractive index relative to pure silica, e.g. germania doped silica. The core region is preferably hole-free. As illustrated in FIG. 6, in some embodiments, the core region 170 comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0 \ \mu m < R_1 < 5.0 \ \mu m$. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2−R1, and W12 is greater than 1 μm. Radius R2 is preferably greater than 5 μm, more preferably greater than 6 μm. The intermediate annular hole-containing region 184 extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm.

The hole-containing region 184 has a radial width W23 which is not less than 0.5 μm. In some embodiments, W23 is not less than 0.5 μm and not greater than 20 μm. In other embodiments, W23 is not less than 2 μm and not greater than 12 μm. In, other embodiments, W23 is not less than 2 μm and not greater than 10 μm. Such fiber can be made to exhibit a fiber cutoff of less than 1400 nm, more preferably less than 1310 nm, and a 20 mm macrobend induced loss of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, and more preferably a 12 mm macrobend induced loss of less than 5 dB/turn, preferably less than 1 dB/turn, and more preferably less than 0.5 dB/turn, and a 8 mm macrobend induced loss of less than 5 dB/turn, preferably less than 1 dB/turn, more preferably less than 0.5 dB/turn with the macrobend induced loss being measured at a reference wavelength of 1550 nanometers.

Figure 7:
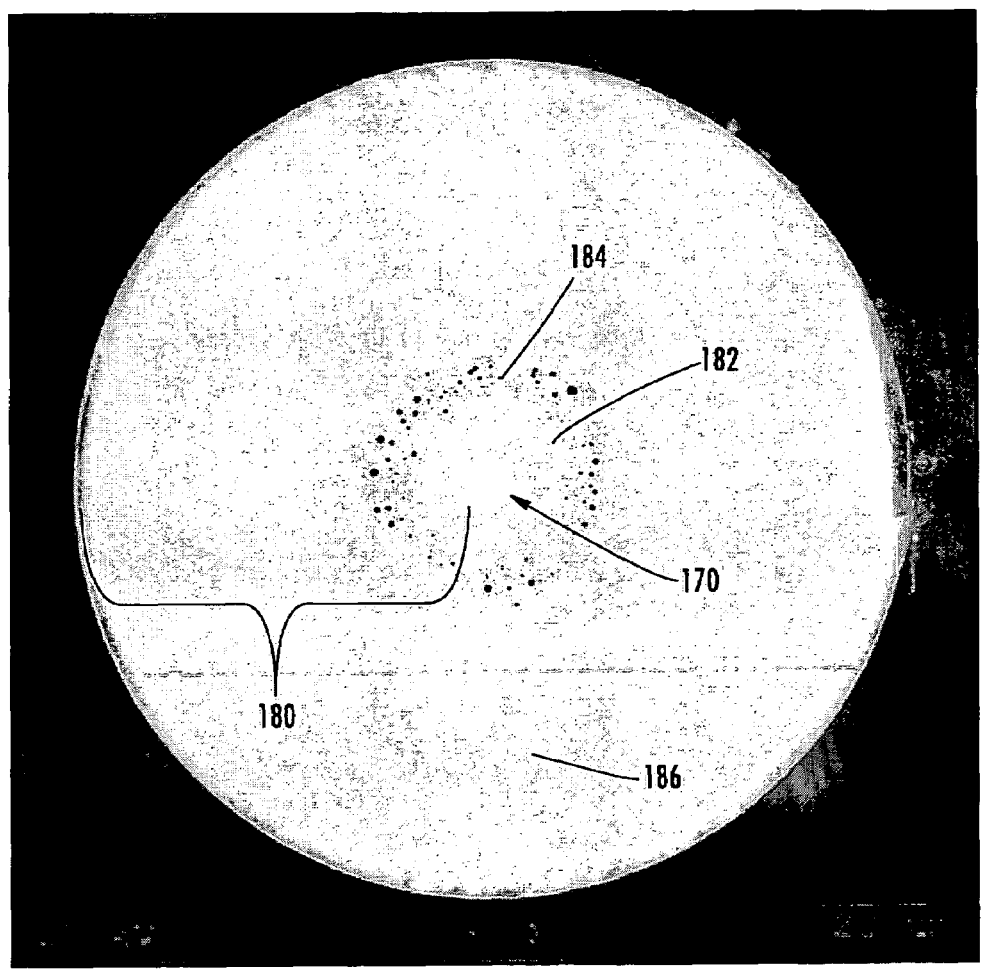
FIG. 7 is a cross-sectional picture of the bend resistant optical fiber used in the buffered optical fiber of FIG. 2.

An example of a suitable bend resistant optical fiber 200 is illustrated in FIG. 7. Optical fiber 200 in FIG. 7 comprises a core region which is surrounded by a cladding region which comprises randomly disposed voids which are contained within an annular region spaced from the core and positioned to be effective to guide light along the core region. Additionally, other types of bend resistant optical fibers may be used with the concepts of the present invention.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A fiber optic cable comprising:
   at least one optical fiber;
   a first strength member;
   a second strength member;
   a core material, the core material generally surrounding the at least one optical fiber, the first strength member, and the second strength member, wherein the core material is deformable for cushioning the at least one optical fiber; and
   a cable jacket, the cable jacket generally surrounding the core material, wherein the fiber optic cable allows a bending radius of about 10 millimeters or less while maintaining a suitable level of optical performance.

2. The fiber optic cable of claim 1, wherein the at least one optical fiber is a bend resistant optical fiber.

3. The fiber optic cable of claim 1, wherein the core material has a generally oval shape.

4. The fiber optic cable of claim 1, wherein the first strength member and the second strength member are generally disposed on opposite sides of the at least one optical fiber and kink in a bend radius of about 30 millimeters or less.

5. The fiber optic cable of claim 1, wherein the first strength member has a tensile strength and a compressive strength and the tensile strength is greater than the compressive strength.

6. The fiber optic cable of claim 1, wherein the first strength member has a partial bend memory for retaining a shape after being bent.

7. The fiber optic cable of claim 1, wherein the cable jacket includes at least one notch for tearing the same.

8. The fiber optic cable of claim 1, wherein the fiber optic cable allows the at least one optical fiber to have a strain at a tensile load of about fifty pounds or less.

9. The fiber optic cable of claim 1, wherein the core material has a modulus of about 300 MPa or less.

10. The fiber optic cable of claim 1, wherein the fiber optic cable has a diameter of about 3 millimeters or less.

11. A fiber optic cable comprising:
   at least one optical fiber, wherein the at least one optical fiber is a bend resistant optical fiber;
   a first strength member, wherein the first strength member has a tensile strength and a compressive strength and the tensile strength is greater than the compressive strength;
   a core material, the core material generally surrounding the at least one optical fiber, wherein the core material is deformable for cushioning the at least one optical fiber; and
   a cable jacket, the cable jacket generally surrounding the core material, wherein the fiber optic cable kinks in a bend radius of about 30 millimeters or less while maintaining a suitable level of optical performance.

12. The fiber optic cable of claim 11, wherein the core material has a generally oval shape.

13. The fiber optic cable of claim 11, wherein the first strength member and the second strength member are generally disposed on opposite sides of the at least one optical fiber and kink in a bend radius of about 30 millimeters or less.

14. The fiber optic cable of claim 11, further including a second strength member, wherein the at least one optical fiber is generally disposed between the first strength member and the second strength member.

15. The fiber optic cable of claim 11, wherein the first strength member has a partial bend memory for retaining a shape after being bent.

16. The fiber optic cable of claim 11, wherein the cable jacket includes at least one notch for tearing the same.

17. The fiber optic cable of claim 11, wherein the fiber optic cable allows the at least one optical fiber to have a strain at a tensile load of about fifty pounds or less.

18. The fiber optic cable of claim 11, wherein the core material has a modulus of about 300 MPa or less.

19. A fiber optic cable comprising:
   at least one optical fiber, wherein the at least one optical fiber is a bend resistant optical fiber;
   a first strength member;
   a second strength member, wherein the first strength member and the second strength member are generally disposed on opposite sides of the at least one optical fiber and kink in a bend radius of about 30 millimeters or less;
   a core material, the core material generally surrounding the at least one optical fiber, the first strength member, and the second strength member, wherein the core material is deformable for cushioning the at least one optical fiber; and
   a cable jacket, the cable jacket generally surrounding the core material, wherein the fiber optic cable kinks in a bending radius of about 30 millimeters or less while maintaining a suitable level of optical performance.

20. The fiber optic cable of claim 19, wherein the first strength member has a tensile strength and a compressive strength and the tensile strength is greater than the compressive strength.

21. The fiber optic cable of claim 19, wherein the first strength member has a partial bend memory for retaining a shape after being bent.

22. The fiber optic cable of claim 19, wherein the cable jacket includes at least one notch for tearing the same.

23. The fiber optic cable of claim 19, wherein the fiber optic cable allows the at least one optical fiber to have a strain at a tensile load of about fifty pounds or less.

24. The fiber optic cable of claim 19, wherein the core material has a modulus of about 300 MPa or less.

* * * * *